(12) United States Patent
Packard

(10) Patent No.: US 7,924,312 B2
(45) Date of Patent: Apr. 12, 2011

(54) INFRARED AND VISIBLE-LIGHT IMAGE REGISTRATION

(75) Inventor: Corey D. Packard, Hancock, MI (US)

(73) Assignee: Fluke Corporation, Everett, WA (US)

( * ) Notice: Subject to any disclaimer, the term of this patent is extended or adjusted under 35 U.S.C. 154(b) by 414 days.

(21) Appl. No.: 12/196,433

(22) Filed: Aug. 22, 2008

(65) Prior Publication Data

US 2010/0045809 A1  Feb. 25, 2010

(51) Int. Cl.
H04N 5/33 (2006.01)
H04N 5/265 (2006.01)
H04N 9/093 (2006.01)

(52) U.S. Cl. .................. 348/164; 348/263; 348/239

(58) Field of Classification Search .................. 348/164, 348/262, 263, 265, 239, 33; 250/330, 332
See application file for complete search history.

(56) References Cited

U.S. PATENT DOCUMENTS

| | | | |
|---|---|---|---|
| 7,034,300 B2 | 4/2006 | Hamrelius et al. | |
| 2006/0203100 A1* | 9/2006 | Ajito et al. | 348/220.1 |
| 2006/0249679 A1 | 11/2006 | Johnson et al. | |
| 2006/0289772 A1 | 12/2006 | Johnson et al. | |
| 2007/0235634 A1* | 10/2007 | Ottney et al. | 250/214 VT |
| 2007/0247517 A1* | 10/2007 | Zhang et al. | 348/30 |
| 2008/0099678 A1 | 5/2008 | Johnson et al. | |
| 2009/0008558 A1* | 1/2009 | Strandemar et al. | 250/330 |
| 2009/0010633 A1* | 1/2009 | Strandemar et al. | 396/121 |
| 2009/0010635 A1* | 1/2009 | Strandemar et al. | 250/330 |
| 2009/0050806 A1* | 2/2009 | Schmidt et al. | 250/332 |
| 2009/0065695 A1* | 3/2009 | DeMarco et al. | 250/330 |
| 2009/0294666 A1* | 12/2009 | Hargel | 250/330 |

OTHER PUBLICATIONS

Fisher, R., et al., Roberts Cross Edge Detector, Feb. 13, 2008, http://homepages.inf.ed.ac.uk/rbf/HIPR2/roberts.htm, pp. 1-7.
Prewitt Edge Magnitude Detection in SA-C, Jun. 12, 2008, http://www.cs.colostate.edu/cameron/prewitt.html, pp. 1-3.
Prewitt, Feb. 13, 2008, http://en.wikipedia.org/wiki/Prewitt, pp. 1-2.
Sobel Operator, Feb. 13, 2008, http://en.wikipedia.org/wiki/Sobel_operator, pp. 1-4.
Registering an Image Using Normalized Cross-Correlation, Feb. 28, 2008, http://www.mathworks.com/products/demos/image/cross_correlation/imreg.html, pp. 1-5.

* cited by examiner

Primary Examiner — Jason Whipkey
(74) Attorney, Agent, or Firm — Fredrikson & Byron, PA

(57) ABSTRACT

Methods and thermal imaging cameras are provided for registering visible-light and infrared images within a thermal imaging camera to reduce a parallax error in the images. Registration generally includes detecting a first feature set in the visible-light image data, detecting a second feature set in the infrared image data and generating a plurality of overlapping alignments of the infrared image data and the visible-light image data. A similarity figure is calculated as a function of the relative alignment of the first feature set and the second feature set for each alignment and the alignment with the desired similarity figure is selected. The images are aligned and the camera displays at least a portion of the visible-light image data and/or at least a portion of the infrared image data.

20 Claims, 11 Drawing Sheets

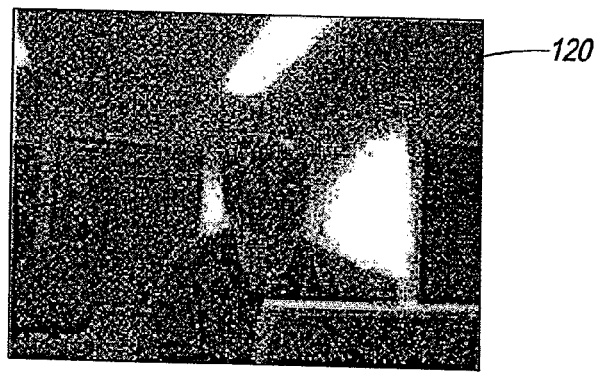
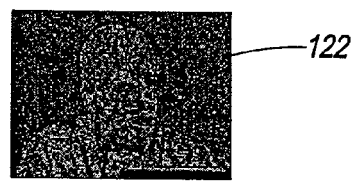
FIG. 11A　　　　　FIG. 11B
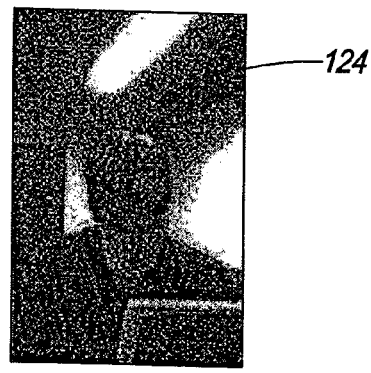
FIG. 12A　　　　　FIG. 12B

INFRARED AND VISIBLE-LIGHT IMAGE REGISTRATION

FIELD

Embodiments of the present invention generally relate to the design and use of thermal imaging, i.e., infrared, cameras. More particularly, embodiments of the invention relate to image alignment within thermal imaging cameras.

BACKGROUND

Many thermal imaging (i.e., infrared) cameras today produce an image (IR image) of a scene using only energy in the far-infrared portion of the electromagnetic spectrum, typically in the 8-14 micron range. Images obtained using these cameras assign colors or gray-levels to the pixels composing the scene based on the intensity of the IR radiation reaching the camera's sensor elements. Because the resulting IR image is based on the target's temperature, and because the colors or levels displayed by the camera do not typically correspond to the visible-light colors of the scene, it can be difficult, especially for novice users of such a device, to accurately relate features of interest (e.g. hot spots) in the IR scene with their corresponding locations in the visible-light scene viewed by the operator. In applications where the infrared scene contrast is low, infrared-only images may be especially difficult to interpret.

An infrared scene is a result of thermal emission and, not all, but most infrared scenes are by their very nature less sharp compared to visible images which are a result of reflected visible-light. For example, considering an electric control panel of an industrial machine which has many electrical components and interconnections, the visible image will be sharp and clear due to the different colors and well defined shapes. The infrared image may appear less sharp due to the transfer of heat from the hot part or parts to adjacent parts.

When panning an area with a thermal imaging camera looking for hot or cold spots, one can watch the camera display for a visible color change. However, sometimes the hot or cold spot may be small and the color change may go unnoticed. To aid in the identification of hot or cold spots, thermal imaging cameras often indicate the hot spot or cold spot location via a visible cursor or other graphical indicator on the display. The temperature of such hot spots, calculated using well-known radiometric techniques (e.g., establishing or measuring a reference temperature), is often displayed nearby the cursor. Even with the color change and the hot spot indications, it can be difficult to accurately relate the hot spot (or other features of interest) in the camera display's IR imagery with their corresponding locations in the visible-light scene viewed by the operator.

To address this problem of better identifying temperature spots of interest, some cameras allow the operator to capture a visible-light image (often called a "control image") of the scene using a separate visible-light camera built into the thermal imaging camera. Some of these thermal imaging cameras allow a user to view the visible-light image side-by-side with the infrared image. However, it is often left to the operator to visually correlate image features of interest in the infrared image with corresponding image features in the visible-light image. To make this comparison easier, some thermal imaging cameras now provide simultaneous viewing of the infrared image and the visible-light image overlapping each other and blended together. For example, Fluke Corporation's FlexCam® series of cameras incorporates a feature called IR-Fusion®, which allows a user to blend the infrared and visible-light images together at any ratio from 100% visible to 100% infrared.

Even when the infrared image and the corresponding visible-light image are overlayed and blended, identifying objects within the images can be difficult due to problems in image alignment. For example, in some cases a parallax error may exist due to the physical placement of the infrared and the visible-light sensor within the same (or different) thermal imaging camera. Accordingly, there exists a desire for improved identification systems, including improved alignment or registration of infrared images and visible-light images in thermal imaging cameras.

SUMMARY

Embodiments of the invention are directed to thermal imaging cameras and methods of registering visible-light and infrared images within the camera to reduce a parallax error. In one embodiment, for example, a method of registering a visible-light image and an infrared image includes receiving visible-light image data and infrared image data. The visible-light image data generally corresponds to a first view of a scene while the infrared image data corresponds to a second view of the scene, so that the views and the visible-light image data and infrared image data have a parallax error. The method further includes detecting a first feature set in the visible-light image data, detecting a second feature set in the infrared image data and generating a plurality of overlapping alignments of the infrared image data and the visible-light image data. A similarity figure that is a function of the relative alignment of the first feature set and the second feature set is calculated for each overlapping alignment. One of the alignments having a desired similarity figure is selected and the visible-light image data and the infrared image data are aligned according to the selected overlapping alignment. The method may also include displaying at least a portion of the visible-light image data and/or at least a portion of the infrared image data.

In some methods of registering image data, the visible-light image data and/or the infrared image data includes color data which is converted to visible-light and/or infrared intensity data, respectively.

In some embodiments, the first and second feature sets may include edges in the visible-light image data and the infrared image data, respectively. In some cases edges may optionally be enhanced, such as by thickening or thinning them. Some embodiments include thresholding the first feature set and the second feature set and generating binary representations of the visible-light image data and the infrared image data.

In some embodiments, the desired similarity figure may represent the greatest degree of similarity between the first feature set and the second feature set among the overlapping alignments. The similarity figure may optionally be compared to a similarity threshold. If the desired similarity is less than the similarity threshold, the selected overlapping alignment may in some cases be set to a default alignment, for example, a manual alignment.

Some methods of registering image data may optionally use only a portion or subset of the visible-light image data and/or the infrared image data to generate a number of alignments. For example, a subset of image data may be determined from a physical configuration of a thermal imaging camera, such as the physical location of a sensor system.

According to another aspect of the invention, a thermal imaging camera including a visible-light camera module, an infrared camera module, a display, and a programmable processor coupled with the display and the infrared and visible-light camera modules, may include instructions for programming the processor to register visible-light image data and infrared image data. In some cases an infrared sensor within the infrared camera module may be offset from a visible-light sensor in the visible-light camera module, thus producing views of a scene with a parallax error. The processor may register the visible-light image data and the infrared image data by detecting feature sets in the image data and aligning the visible-light image data and the infrared image data according to one of a number of overlapping alignments having a desired similarity figure, where the similarity figure is indicative of the relative alignment of the first feature set and the second feature set. After aligning the image data, the processor may then display at least a portion of the visible-light image data and/or at least a portion of the infrared image data.

In some embodiments of the invention, the visible-light camera module and the infrared camera module may optionally be positioned so that the first view and the second view are substantially aligned in one more directions. For example, the modules may be arranged so that view from the vertical-light camera module is substantially horizontally or vertically aligned with the second view from the infrared camera module.

According to another aspect of the invention, a thermal imaging camera according to the invention may include a manual adjustment mechanism for reducing the parallax error between visible-light image data and infrared image data. For example, a manual adjustment mechanism can include focusable optics for adjusting the first view of the scene or the second view of the scene. A processor within the thermal imaging camera may select a portion of the visible-light image data and/or the infrared image data based on the setting of the manual adjustment mechanism. The image portion can then be used to more quickly and efficiently align the visible-light image data and infrared image data. In some cases, if a desired similarity figure is less than a similarity threshold, the processor may default to displaying a manual alignment.

BRIEF DESCRIPTION OF THE DRAWINGS

FIG. 11A illustrates a visible-light image of a first view of a scene.

FIG. 11B illustrates infrared image data of a second view of the scene depicted in FIG. 11A.

FIG. 12A illustrates a cropped version of the image in FIG. 11A converted to a grayscale representation.

FIG. 12B illustrates the image in FIG. 11B converted to a grayscale representation.

DETAILED DESCRIPTION OF THE PREFERRED EMBODIMENTS

Figure 1:
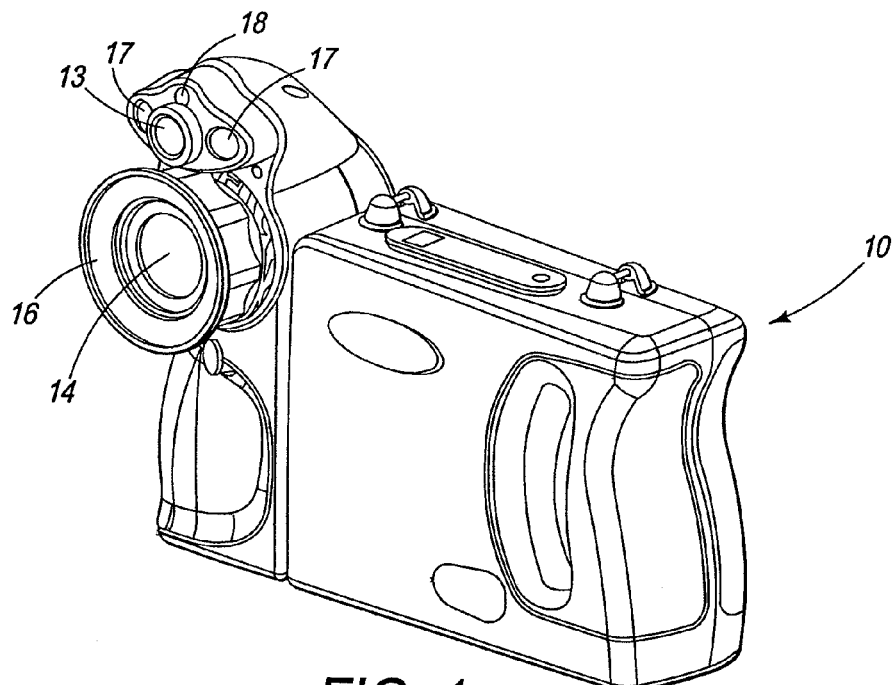
FIG. 1 is a front perspective view of a thermal imaging camera according to an embodiment of the invention.

The following detailed description should be read with reference to the drawings, in which like elements in different drawings are numbered identically. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Figure 2:
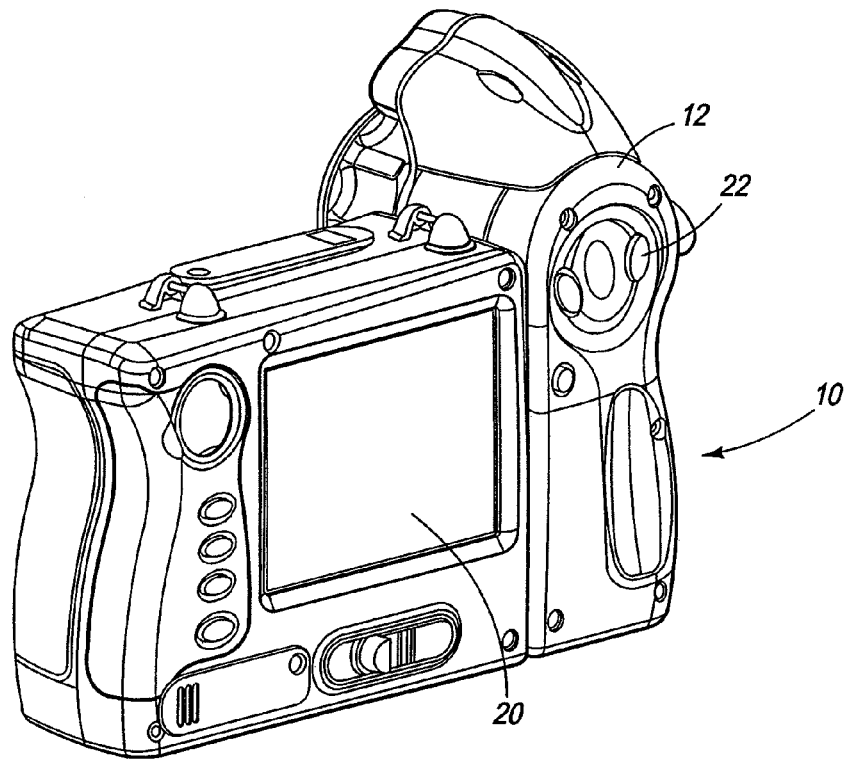
FIG. 2 is a rear perspective view of a thermal imaging camera according to an embodiment of the invention.

FIGS. 1 and 2 are perspective views, respectively, of the front and the back of a thermal imaging camera 10 according to an embodiment of the invention. The housing includes an infrared camera module and a visible-light camera module. In particular, the camera 10 includes a camera housing 12, a visible-light lens 13, an infrared lens 14, focus ring 16 and a laser pointer 18 as well as various electronics located within the housing as will be described with reference to FIG. 3. In an embodiment, an LED torch/flash 17 is located on each side of the visible-light lens 13 to aid in providing enough light in dark environments. A display 20 is located on the back of the camera so that infrared images, visible-light images and/or blended images of infrared and visible-light may be viewed. In addition, target site temperature (including temperature measurement spot size) and distance readings may be displayed. Also located on the back of the camera are user controls 22 to control the display mode and activate or deactivate the laser pointer.

Figure 3:
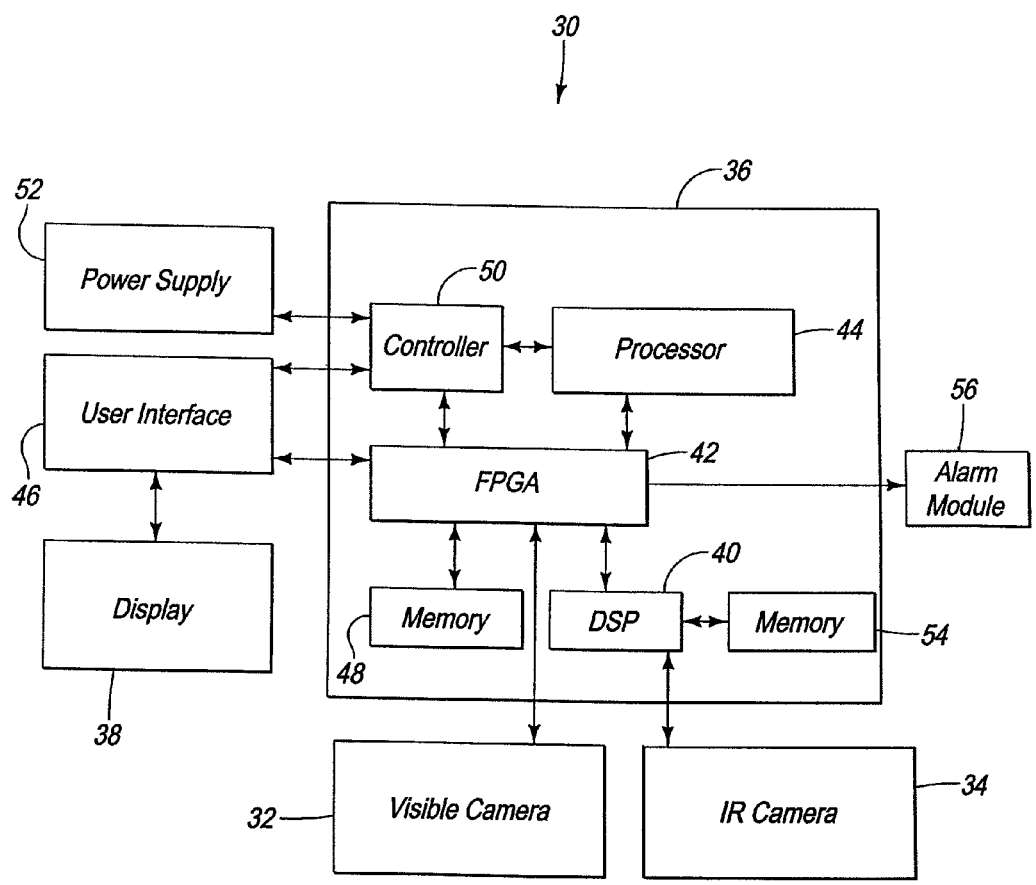
FIG. 3 is a block diagram of a thermal imaging camera according to an embodiment of the invention that can be used to practice embodiments of the invention.

FIG. 3 shows a block diagram of a representative thermal imaging camera 30 according to an embodiment of the invention that can be used to practice embodiments of the invention. The camera 30 generally includes a visible-light camera module 32, an infrared camera module 34, and a processing sub-system 36 that receives and processes image data from the camera modules and outputs corresponding image data to a display 38. The visible-light camera module 32 in some embodiments may include a CMOS, CCD or other type of visible-light camera system. It may also include accessories such as an LED torch/flash and/or a laser pointer. The visible-light camera module 32 includes a visible-light sensor that captures a visible-light image of a scene and generates and streams corresponding visible-light image data (e.g., RGB, 10 Hz) to the processing sub-system 36. While the visible-light camera module may include a video camera in some embodiments, this is not required, and its output may only include still photographs or images.

The infrared camera module 34 generally may include an analog engine that interfaces with and controls an infrared sensor that captures an infrared image of the scene and generates and streams raw infrared image data (e.g. 30 Hz) to the processing sub-system 36. Just as with the visible-light camera module, the infrared sensor may include still image capture or video-rate capture. In one embodiment, within the sub-system 36, the infrared image data is directed to a digital signal processor (DSP) 40 that performs computations to convert the raw infrared image data to scene temperatures, and then to, e.g., RGB colors corresponding to the scene temperatures and a selected color palette. For example, U.S. Pat. No. 6,444,983 entitled "Microbolometer Focal Plane Array With Controlled Bias," incorporated herein in its entirety, discloses such an infrared camera. The DSP 40 then streams the resulting infrared image data combined with color data (e.g., RGB form) to an FPGA 42 where it may be combined with the visible-light image data. In another embodiment, the DSP 40 may provide the infrared image data directly to the FPGA 42 without converting it to scene temperatures and/or colors. The FPGA 42 then combines the infrared image data and the visible-light image data to a desired degree and sends the combined image data to the display 38.

Among other components, the processing sub-system 36 includes a general-purpose microprocessor 44 that provides a graphical user interface (GUI) to the camera operator. This GUI interface consists of menus, text, and graphical display elements that are sent to the FPGA 42, where they are buffered in memory 48 and then sent to the display 38. A microcontroller 50 interfaces with the user interface 46 including camera buttons, mouse, LCD backlight, and a power supply 52 (e.g., smart battery). It reads these inputs and provides the information to the processor 44 where it is used to control the GUI and provides other system control functions.

The FPGA 42 drives the display(s) 38 (LCD and/or TV, for example) with combined visible-light image data, infrared image data, and/or GUI data. The FPGA 42 requests both the visible-light and infrared image data from the visible-light and infrared camera modules and in some embodiments alpha-blends them together. It may also alpha-blend the resulting display image with the GUI data to create a final blended image that is sent to the display 38. Of course the display 38 associated with the embodiments of the invention is not limited to an LCD-type display. The FPGA 42 operates under control of the DSP 40, which is further controlled by the processor 44. Additional memory 54 may be programmed with instructions for controlling the DSP 40 and the general processor 44. In some cases the processing sub-system 36 may output an alarm signal to an alarm module 56 to alert a camera user in the event that certain temperature events have occurred.

According to some embodiments of the invention, a thermal imaging camera provides a real-time visible-light camera module physically located close to a real-time infrared camera module in the same housing such that the optical axes of the modules are roughly parallel to each other. For example, a visible-light camera module may be placed in the housing of a real-time thermal imaging camera having an infrared camera module. The placement is such that the visible and infrared optical axes are as close as practical and roughly parallel to each other. Referring to FIG. 1, for example, the visible-light lens 13 and the infrared lens 14 may be co-located in the vertical plane of the infrared optical axis. Of course other spatial arrangements are possible, such as, for example, co-location within a horizontal plane.

Figure 4:
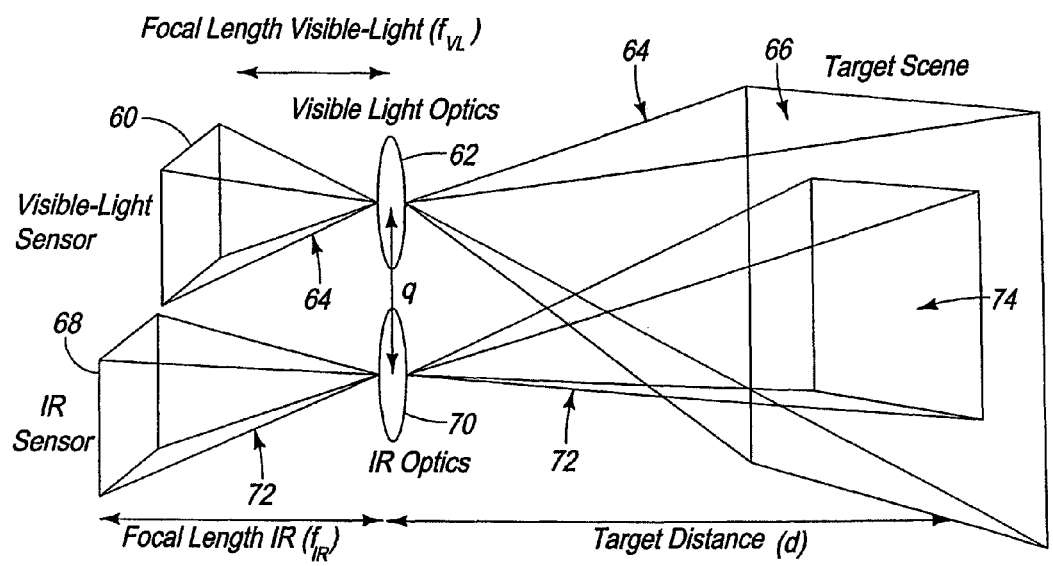
FIG. 4 is a schematic diagram showing the sensor and optical system configuration of a thermal imaging camera according to an embodiment of the invention.

FIG. 4 is a diagram showing the optical paths and sensor configuration of a thermal imaging camera according to one embodiment. A visible-light camera module including a visible-light sensor 60 and visible-light optics 62 define a first optical path 64 and view 66 (i.e., "field of view") of the target scene, while an infrared camera module including an infrared sensor 68 and infrared optics 70 define a second optical path 72 and view 74 of the target scene. In some embodiments, the visible-light camera module is configured to have a larger view 66 than the infrared camera module's view 74, although this is not required. Such a configuration provides cost effectiveness because presently, for a given number of pixel sensors, visible-light sensor arrays are much cheaper than infrared sensor arrays. Accordingly, for a given view and resolution, visible-light sensor arrays are cheaper than infrared sensor arrays.

Figure 5:
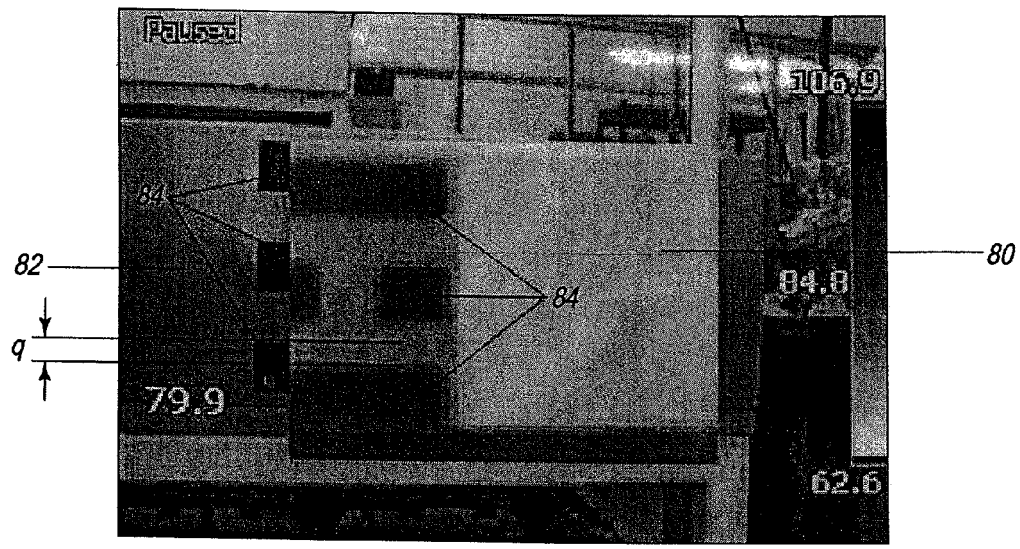
FIG. 5 illustrates a display of infrared image data combined with a visible-light image data and uncorrected for parallax error.

Because the optical paths for the sensors are different, each sensor will "see" the target scene from slightly different vantage points thereby resulting in parallax error in the views 66, 74, respectively. When combining the visible-light image data and the infrared image data, the inherent parallax error leads to misalignment of the images. For example, FIG. 5 depicts a parallax error in a combined picture-in-a-picture display of an infrared image 80 within a visible-light image 82. Looking at the rectangular dark sections 84, one can see that the infrared image 80 and the visible-light image 82 are misaligned. Such misalignment can make identifying objects of interest within the images difficult.

Figure 6:
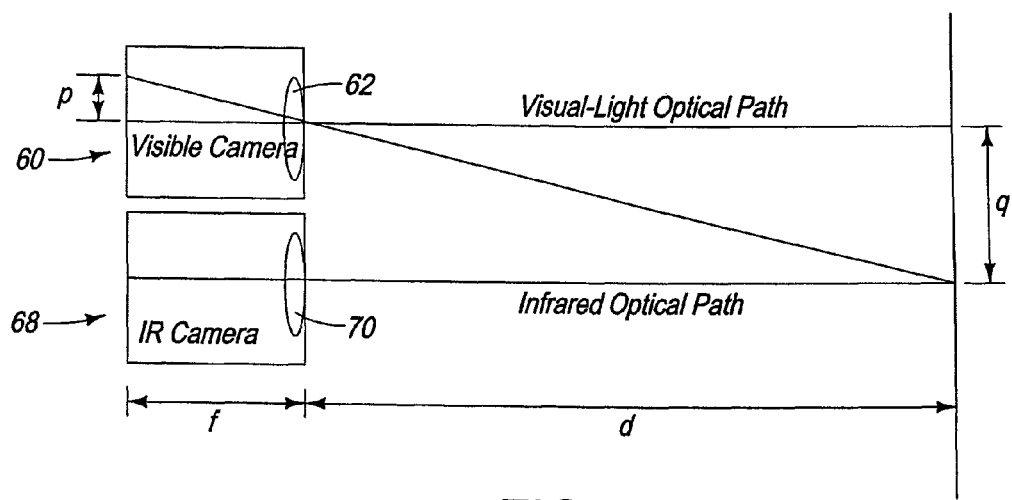
FIG. 6 is a schematic diagram showing a geometric derivation of the parallax equation.

FIG. 6 shows, geometrically, the derivation of the parallax equation ($p=qf/d$). Parallax (p) can be reduced by minimizing the distance (q) between the visible-light and infrared optical apertures, and also by choosing lenses with short focal lengths (f), or by increasing the distance (d) to the target scene. As shown in FIG. 6, the parallax relationship between the visible-light camera module and the infrared camera module can be simply described in terms of a single distance (q) within a planar dimension defined by the camera modules. However, in alternative embodiments, the parallax may be described using an alternate coordinate system. For example, the distance (q) may be determined from a horizontal component ($q_h$) and a vertical component ($q_v$) with respect to the thermal imaging camera.

The camera design will typically physically fix (q). In certain embodiments, the focal lengths (f) of the visible-light and infrared lens can be altered in the field by changing lenses, or using optical systems that include multiple focal lengths or continuous zoom. In FIG. 6, the focal length (f) of each lens is fixed and the same. In alternate embodiments, the focal lengths (f) of the infrared lens and the visible lens may differ. In embodiments with fixed focal length lenses, the focal lengths remain constant during operation once the lenses are installed. As a consequence, during camera operation, parallax is simply a function of distance (d) to the target.

Thus, one method of reducing or correcting the parallax error in the image data includes determining the distance (d) to the target scene, calculating the parallax offset (p), and correcting the alignment of the visible-light image and the infrared image before displaying one or both of the images. The distance (d) to the scene may be determined using a variety of methods according to certain embodiments. For example, in some cases the distance (d) may be measured using a laser, or directly input by a camera user with knowledge of the target area dimensions.

In another embodiment, the target scene distance (d) may be estimated by pre-calibrating a range of focal positions for one of the infrared and visible optics to correspond to a range of target distances, as described in co-pending U.S. patent application Ser. No. 11/294,752, filed Dec. 5, 2005, the contents of which are hereby incorporated by reference. For example, in certain embodiments, the visible-light camera module is configured to remain in focus at all usable distances (i.e., focused at infinity) and the focus of the infrared camera module can be adjusted by moving the infrared sensor 68 or the infrared optics 70 along a range of motion. The target distances corresponding to the sensor/optics focus positions can be predetermined at the factory and stored with other camera calibration data in the camera's non-volatile memory.

Figure 7:
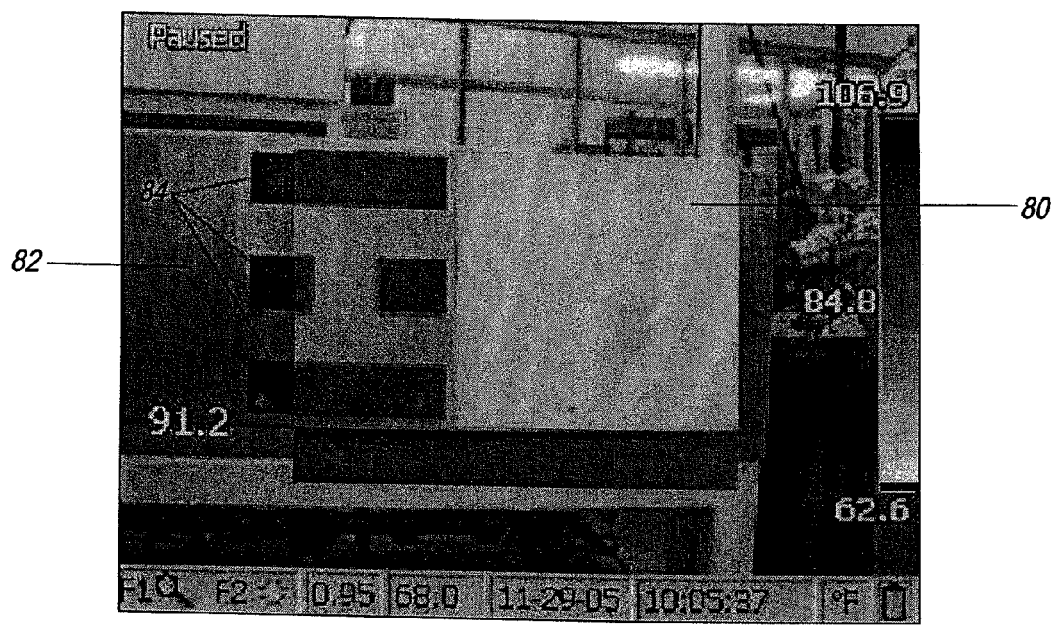
FIG. 7 illustrates the combined infrared and visible-light images of FIG. 5 aligned and corrected for parallax.

The calibration data includes image offsets calculated for each infrared focus distance. By sensing the focus distance (via the position of the infrared lens or sensor), the correct offset (e.g., horizontal and vertical components ($q_h$) and ($q_v$)) for the visible-light image data with respect to the infrared image data can be computed or retrieved from memory. This offset can then be used to select the appropriate visible-light image data so that the scene in both the visible-light image data and the infrared image data is aligned. That is, as the focus distance of the infrared lens is changed, different areas of the visible-light sensor image are extracted and displayed, resulting in registration of the infrared and visible-light images for objects at the focus distance. FIG. 7 shows the images from misaligned FIG. 5 now corrected for parallax error. The rectangular dark sections 84 in the infrared image 80 are registered with the portions of such sections 84 in the visible-light image 82, showing that infrared image is now properly focused.

Figure 8:
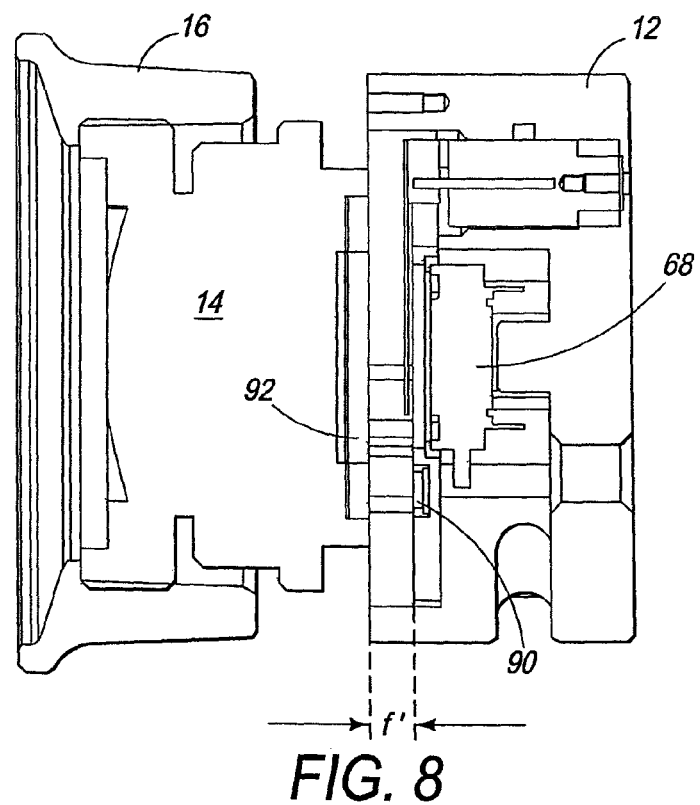
FIG. 8 is a cross-sectional view of a thermal imaging camera module with a magnet and sensor in a first position according to an embodiment of the invention.
Figure 9:
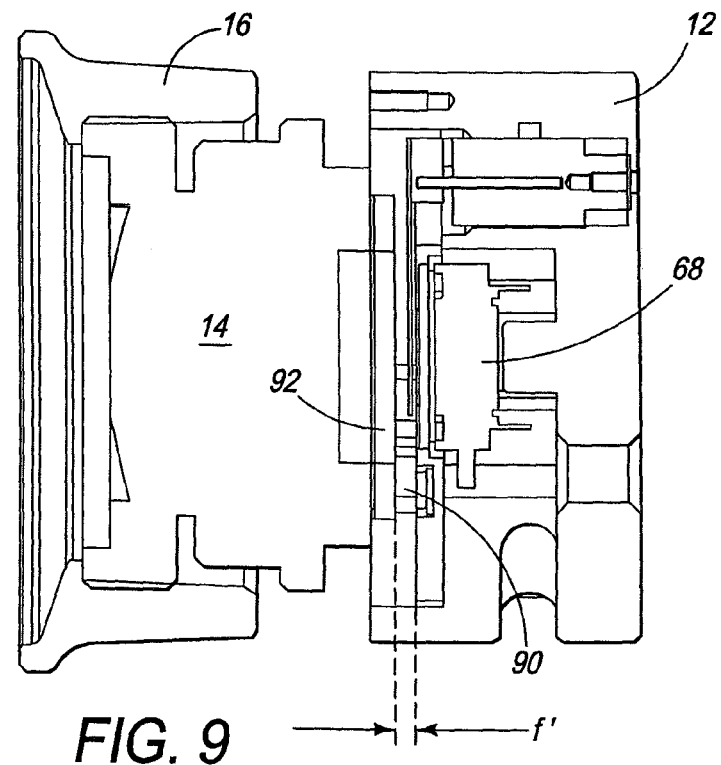
FIG. 9 is a cross-sectional view of the thermal imaging camera module of FIG. 8 with the magnet and sensor in a second position according to an embodiment of the invention.

One method to determine the target distance (d) is to sense the focus position of the infrared lens using a Hall-effect sensor. FIGS. 8 and 9 show a sectional view of camera 10 taken from front to rear through the center of the infrared lens 14. Referring to FIGS. 8 and 9, a Hall-Effect sensor 90 is fixed in the housing 12 with respect to the infrared sensor array 68 to sense the proximity of a magnet 92 attached to the back of the infrared lens 14.

In the embodiment shown in FIGS. 8 and 9, the magnet 92 is a ring that encircles an interior surface of the focus ring 16 facing the infrared sensor array 68. The Hall-Effect sensor 90 is fixed in the camera housing 12 a small distance from the infrared sensor array 68. The distance between the Hall-Effect sensor and the magnet represents the distance f' shown in FIGS. 8 and 9. FIG. 8 shows the lens 14 positioned for near focus and FIG. 9 shows the lens 14 positioned for far focus in which case the magnet is closer to the Hall-Effect sensor than in FIG. 8.

As the focus of the lens 14 is changed via rotation of the focus ring 16, the distance f' between the magnet 92 and the Hall-Effect sensor 90 changes, resulting in an output from the Hall-Effect sensor that is proportional to focus position. (The focus of the lens could be changed by moving the lens or moving the infrared sensor array.) This focus position information is then used to generate an estimate of the distance to the target, after which the parallax offset can be determined and the images more easily aligned. The infrared lens focus position provides an especially convenient estimate of distance because typical infrared lenses have a low F-number, resulting in a shallow depth of field. The Hall-Effect sensor may, in one embodiment, be fixed on the infrared sensor array. In addition, the positions of the Hall-Effect sensor and magnet may be reversed from that shown. Of course, mechanisms and methods other than those described above for a Hall effect sensor may be employed to determine the distance to target. Such equivalent mechanisms or methods would be known to those with skill in the art. The Hall-Effect sensor is one convenient method.

While aligning image data within the camera through the use of the parallax equation can be helpful, determining the distance to the target scene is not always easy or convenient. Predetermining the correlation between focus position and target distance and calibrating each individual thermal imaging camera at the factory can be time consuming and expensive. In addition, basing alignment upon focus position can introduce inaccuracies from a user's less than ideal focusing of the camera or from changes in the magnetic properties of the position sensing mechanism. Thus, certain embodiments of the invention also provide another method of correcting or reducing the parallax error independent of the distance between the imaging camera and the target scene.

Figure 10:
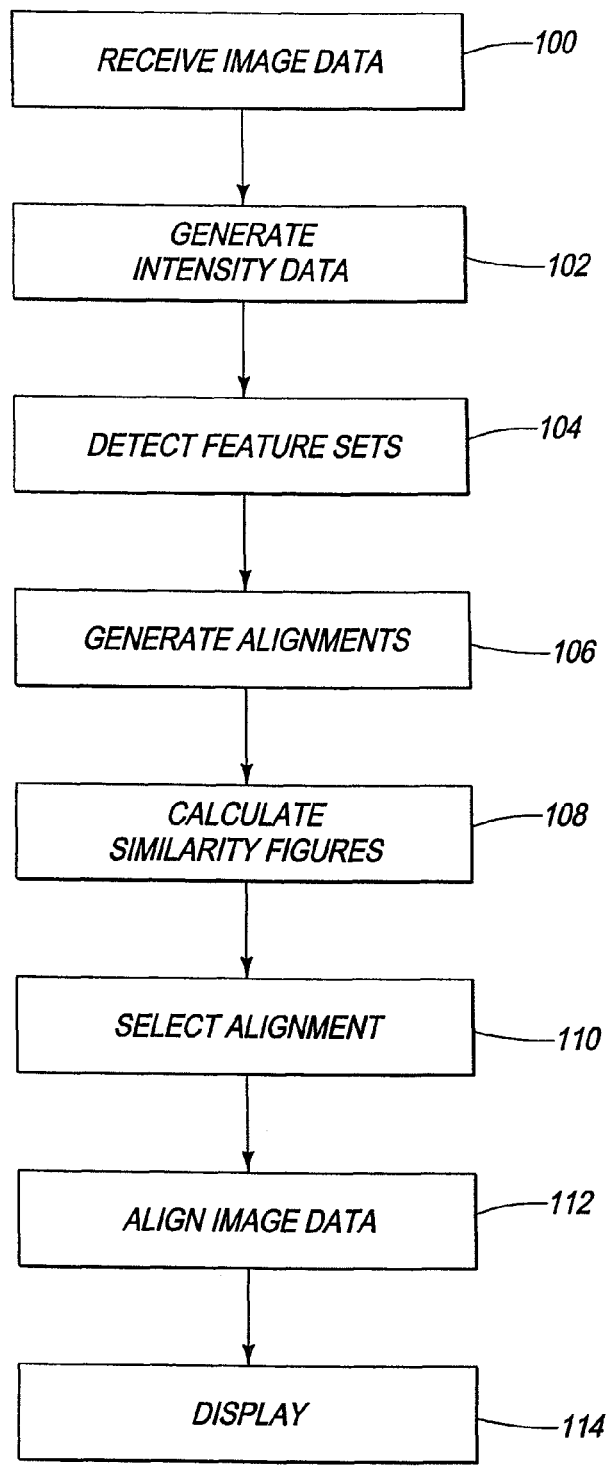
FIG. 10 illustrates a method of reducing parallax error between visible-light image data and infrared image data.

Referring now to FIG. 10, a method of automatically aligning visible-light image data and infrared image data having a parallax error is illustrated according to certain embodiments. The process may generally be carried out by software and/or hardware within the thermal imaging camera, for example, by a programmable processor such as, for example, the processor 44, the FPGA 42, or the DSP 40 in the processing sub-system 36 illustrated in FIG. 3. Of course, the method may be implemented in a variety of manners as will be appreciated by those skilled in the art.

Referring now to both FIGS. 3 and 10, the processing sub-system 36 receives image data 100 in the form of visible-light image data from the visible-light camera module 32 and infrared image data from the infrared camera module 34. The system then generates intensity data 102 from the image data if needed and detects one or more feature sets 104 in the image data. A number of alignments 106 of the visible-light image data and the infrared image data are then generated. The system calculates a similarity FIG. 108 for each alignment, which is generally a function of the degree of correspondence between features in the visible-light image data and infrared image data. One of the alignments is selected 110 and the visible-light image data and infrared image data are aligned 112 and displayed 114.

FIGS. 11-15 illustrate an alignment of visible-light image data and infrared image data using the method illustrated in FIG. 10 to reduce a parallax error. The processing sub-system receives visible-light imaging data corresponding to a first view of a scene, depicted as a visible-light image 120 in FIG. 11A. The processing system also receives infrared image data corresponding to a second view of a scene, depicted as an infrared image 122 in FIG. 11B. The first and second views, and thus the corresponding image data, have a parallax error, which is typically due to the offset positioning of the infrared and visible-light optical/sensor systems within the thermal imaging camera.

In certain embodiments, the processing sub-system may receive a larger amount of visible-light image data than infrared image data. For example, in one embodiment, the visible-light sensor has 1280 by 1024 pixels and the infrared sensor has 160 by 120 pixels. These particular dimensions are given by way of example and are not limiting to any of the embodiments of the invention. Thus, the visible-light image data and the infrared image data may each be individually larger or smaller than the particular examples given.

After receiving the image data, in some embodiments the system then generates image intensity data from the visible-light and/or infrared image data. In one embodiment, for example, visible-light image data is typically received from the visible-light camera module as RGB color image data. The processing sub-system receives this RGB visible-light image data and generates corresponding visible-light intensity data. This step may include, for example, generating a grayscale representation of the RGB visible-light image data. FIG. 12A illustrates a partial grayscale image 124 of the image 120 in FIG. 11A. Creating a grayscale, i.e., magnitude-only, representation of the data can assist in detecting features and aligning the visible-light image data with the infrared image data as will be discussed further herein. Of course, in certain embodiments, the visible-light camera module may include a "black and white" (i.e., magnitude sensing only) camera, and so conversion of color data may not be performed, as the visible-light image data already merely includes magnitude information.

A number of methods may be used to convert image data to grayscale representations. In certain embodiments, a weighted average of the RGB components of the data may be used, while in other embodiments, a single component, e.g., green, may be used to represent the overall intensity of the image data. Those skilled in the art will appreciate that a variety of methods may also be used to generate intensity data.

Infrared image data is typically received from the infrared camera module in the form of raw intensity data corresponding to the magnitude of thermal radiation emitted from the scene. In some embodiments the processing sub-system may directly compare this infrared intensity data with the visible-light intensity data. In certain embodiments, however, the system may first convert the raw infrared image data to scene temperatures and then to RGB colors corresponding to a selected color palette for display on the thermal imaging camera. The infrared image 122 of FIG. 11B illustrates an example of a pseudo-color infrared image. In this case, the processing sub-system may also recreate or generate infrared intensity data from the pseudo-color image, e.g., in the form of a grayscale representation that can then be compared to the visible-light intensity data. For example, the processing sub-system may "decode" the pseudo-color image using the color palette that was used to generate the pseudo-color image. FIG. 12B illustrates a grayscale representation 126 of the pseudo-color image 122 of FIG. 11B.

Referring again to FIG. 10, after receiving visible-light and infrared image data from the camera modules (and separately generating intensity data in some cases), the processing sub-system detects a first set of features within the visible-light image data and a second set of features within the infrared image data (104). These feature sets can then be used, as will be discussed, to align the visible-light image data and the infrared image data.

For example, in some embodiments, the method includes detecting a first set of edges in the visible-light image data and a second set of edges in the infrared image data. Because the visible-light image data and the infrared image data depict slightly different views of the same scene, they will have similar edges, which can be used to align the images. In certain embodiments, a variety of gradient estimators may be used to locate edges within the images. In one embodiment a Prewitt operator is used to detect one or more edges in the visible-light and infrared images. The Prewitt operator convolves two 3×3 kernels with each of the images to detect horizontal and vertical edges. The Prewitt kernels are:

$G_x$=[-1 0 1, -1 0 1, -1 0 1] $G_y$=[-1 -1 -1, 0 0 0, 1 1 1]

Figure 13A:
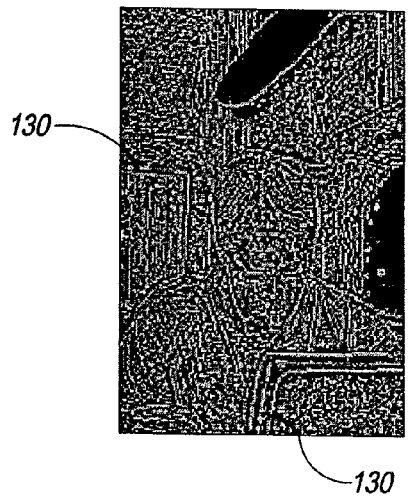
FIG. 13A illustrates a number of edges extracted from the image of FIG. 12A.
Figure 13B:
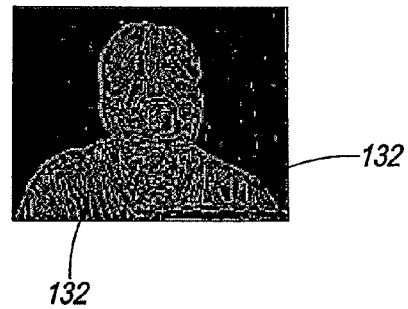
FIG. 13B illustrates a number of edges extracted from the image of FIG. 12B.

FIGS. 13A and 13B illustrate the results of this operation. In FIG. 13A, the Prewitt operator has detected a number of horizontal and vertical edges 130 in the visible-light image data from FIG. 12A. FIG. 13B illustrates a number of edges 132 detected in the infrared image data in FIG. 12B. The simplicity of the Prewitt convolution kernels allows for easy implementation and computation, which can be important in portable cameras with limited space and computing power.

Other operators may also be used to detect edges in the visible-light image data and the infrared image data. Instead of a Prewitt operator, a Sobel operator or a Roberts operator may be implemented to detect edges in the images. The Sobel operator, including the convolution kernels $G_x$=[1 0 -1, 2 0 -2, 1 0 -1] and $G_y$=[1 2 1, 0 0 0, -1 -2 -1], can provide improved noise suppression through smoothing, but is somewhat more computationally expensive than the Prewitt operator. The Roberts operator includes the 2×2 kernels $G_x$=[1 0, 0 -1] and $G_y$=[0 1, -1 0]. The simplicity of the Roberts operator allows for easy implementation and computation, but the smaller kernel size provides less information than the Prewitt and Sobel operators.

Detecting feature sets, such as edges, within the visible-light image data and the infrared image data allows the camera to find points of commonality between the two images that can then be used to align the images. Before determining the optimal alignment to correct for parallax, one or more optional steps of feature processing may be used to increase the likelihood that an accurate alignment will be found. For example, in some embodiments, optional feature processing steps may include feature enhancement and/or feature thresholding.

Artificially enhancing the first and second feature sets in the image data can make the features more recognizable when comparing the visible-light image data with the infrared image data. For example, in one embodiment, edges detected within the image data may be either thickened or thinned as needed to make them stand out to a greater degree. Depending upon available processing power and battery life, these additional steps can improve success in finding a suitable alignment. However, thickening and thinning of edges are not required and the methods described herein may operate suitably without them.

Figure 14A:
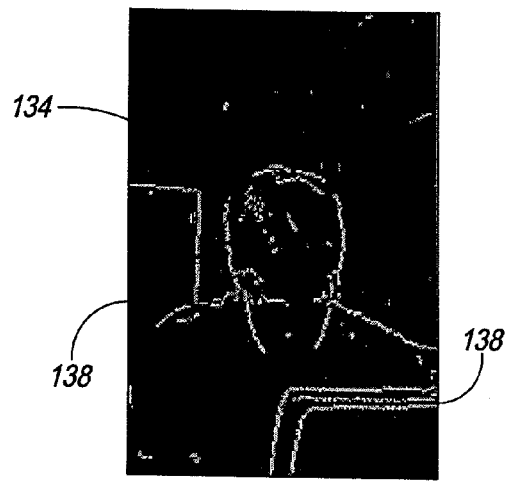
FIG. 14A illustrates a representation of FIG. 13A after applying a feature threshold.
Figure 14B:
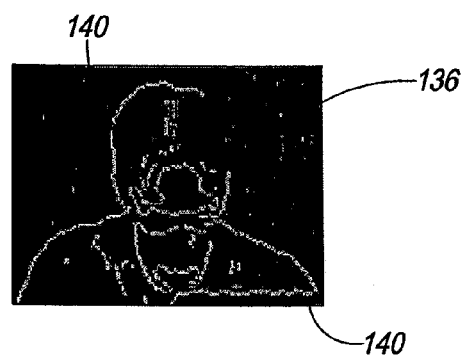
FIG. 14B illustrates a representation of FIG. 13B after applying a feature threshold.

Thresholding the first and second feature sets allows the processing sub-system to determine the most distinctive features and use these to align the visible-light and infrared image data. For example, in some embodiments of the invention, an average background value is calculated and scaled for both the visible-light and the infrared image data. Features with a value greater than the threshold (e.g., edge pixels with a gradient value greater than the threshold) are set to binary 1 representing white pixels and features with a value less than the threshold (e.g., edge pixels with a lower gradient) are set to binary 0 representing black pixels. Thus, a binary representation is generated of the strongest features (e.g., edges). FIGS. 14A and 14B illustrate thresholded images 134 and 136 of FIGS. 13A and 13B, respectively. As can be seen, the strongest features 138 in the visible-light image 134 tend to match the strongest features 140 in the infrared image 136, thus further assisting in aligning the images.

Referring again to FIG. 10, after detecting the feature sets in the image data (and optionally enhancing and/or thresholding the features), multiple overlapping alignments of the visible-light image data and the infrared image data are generated 106. For example, in certain embodiments, the system may generate every possible alignment of visible-light pixels and infrared pixels by "sliding" the infrared image data horizontally and vertically over the visible-light image data. For each overlapping alignment, a similarity figure is calculated 108 representative of the degree of cross-correlation between the first feature set in the visible-light image data and the second feature set in the infrared image data. In one embodiment a similarity figure can be calculated by adding up the number of white (1) pixels overlapping in the two images for a particular alignment. Thus the similarity figure is a function of the relative alignment of the first feature set and the second feature set.

In determining the similarity feature, overlapping alignments, or even feature detection, some embodiments of the invention extract a subset of the visible-light image data and/or the infrared image data, rather than performing computations on the entire data sets. Working with smaller data sets can provide faster and more efficient processing than with the entire image data sets, which can be preferable for portable cameras with limited processing power and energy. After performing the desired computations and determining the preferred alignment between the subset(s) of visible-light and/or infrared image data, the entire images can be built back around the subset(s) if desired.

In certain embodiments, a subset of the visible-light image data may be employed in generating the multiple overlapping alignments. Often the visible-light image module is fixed within the imaging camera in relation to the infrared image module. The camera modules are usually vertically or horizontally aligned within the camera housing, thus reducing or eliminating parallax error across that axis. Referring to FIG. 1, the optical lens 13 and the infrared lens 14 are vertically aligned, thus reducing the parallax error across the vertical axis and along the horizontal axis. Accordingly, the visible-light image data 124 (the larger of the two images) in FIG. 12A can be repeatedly and reliably cropped to match the horizontal dimensions of the infrared image data 126 in FIG. 12B. The use of the subset of visible-light image data in grayscale conversion, edge detection, and edge thresholding allows for faster and more efficient processing. Subset extraction is not limited to horizontal cropping, however, and may be used to compare a small portion of either of the infrared or visible-light image data to the other.

In certain embodiments, the manual adjustment mechanism depicted in FIGS. 8 and 9 (i.e., the focusable optics and Hall-effect sensor) can be used prior to the more automatic method of FIG. 10 to roughly estimate the alignment of the visible-light and infrared images and narrow the number of possible alignments that need be considered. As just one example, it may be determined that when a camera user has roughly focused the camera, the parallax error between the visible-light and infrared image data is within 10 pixels of the true alignment. Accordingly, a smaller subset of the image data can be compared and an alignment decision can be reached more quickly.

Figure 15:
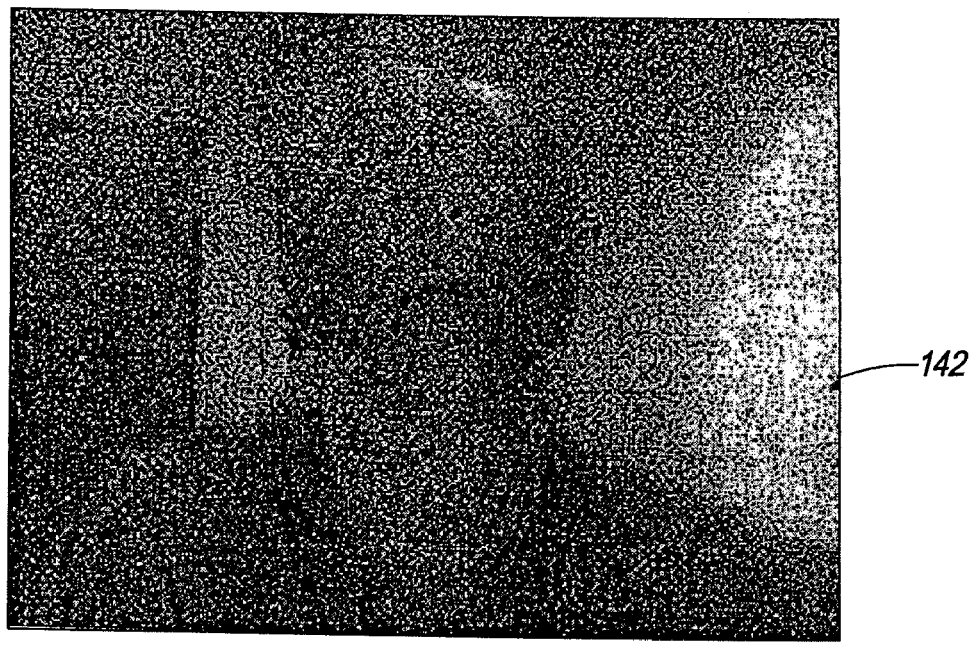
FIG. 15 illustrates the combined and aligned visible-light image data and infrared image data illustrated in FIGS. 11A and 11B.

After generating multiple possible alignments and calculating similarity figures for each, one of the alignments having a desired similarity figure is selected 110 and the images are aligned 112 before being displayed 114. FIG. 15 illustrates the combined image 142 including both visible-light image data and infrared image data. Typically the desired similarity figure will represent the greatest degree of similarity of the visible-light image data and the infrared image data among the multiple possible alignments. In some embodiments the desired similarity figure (e.g., the greatest similarity figure) is compared to a similarity threshold to determine whether the proposed alignment meets a pre-defined confidence level. If the images are similar enough in a particular alignment to meet the similarity threshold, then the images are aligned and displayed. If, however, the similarity figure does not exceed the similarity threshold, the system will typically not change alignments, and may set the selected overlapping alignment to a default alignment, such as a manual alignment set by a manual adjustment mechanism (e.g., focusing optics).

As previously discussed, the method of FIG. 10, as well as other optional steps, may be carried out in the processing sub-system shown in FIG. 3 according to some embodiments of the invention. Separate program modules may be called for various portions of the method. For example only, sub-routines may be carried out in the programming language Matlab® by Mathworks by calling, e.g., Matlab's "edge" function and/or Matlab's "cross-correlation" function.

Once the images are aligned, at least a portion of one of the visible-light data and/or the infrared image data is displayed for the camera user to see. The images may be displayed in a variety of manners, including in various sizes and ranging from 100% visible image to 100% infrared image, with varying degrees of blending in between. In some cases only temperatures from the infrared image data may be displayed over a portion of the visible-light image data. Co-pending U.S. patent application Ser. No. 11/294,752, filed Dec. 5, 2005, the contents of which are hereby incorporated by reference, describes a variety of display options which may be implemented. After parallax error correction, each resulting infrared display pixel will represent substantially the same view as its corresponding visible-light display pixel. Because the two images are matched, the camera operator can easily identify points-of-interest in the infrared image with objects in the visible-light image simply by noting where the features of interest overlie each other in the two images.

Thus, embodiments of INFRARED AND VISIBLE-LIGHT IMAGE REGISTRATION are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method of registering a visible-light image and an infrared image in a thermal imaging camera, comprising:
    receiving visible-light image data corresponding to a first view of a scene and infrared image data corresponding to a second view of the scene, the first view and the second view, and the corresponding visible-light image data and infrared image data, having a parallax error;
    detecting a first feature set in the visible-light image data;
    detecting a second feature set in the infrared image data;
    generating a plurality of overlapping alignments of the infrared image data and the visible-light image data;
    calculating a similarity figure for each overlapping alignment, the similarity figure being a function of the relative alignment of the first feature set and the second feature set;
    selecting one of the overlapping alignments having a desired similarity figure;
    aligning the visible-light image data and the infrared image data according to the selected overlapping alignment; and
    displaying at least a portion of the visible-light image data and/or at least a portion of the infrared image data.

2. The method of claim 1, wherein the visible-light image data comprises color data and further comprising converting the visible-light image data to visible-light intensity data.

3. The method of claim 1, wherein the infrared image data comprises color data and further comprising converting the infrared image data to infrared intensity data.

4. The method of claim 1, wherein the first and second feature sets comprise edges in the visible-light image data and the infrared image data, respectively.

5. The method of claim 4, further comprising enhancing the edges in the first and second feature sets.

6. The method of claim 1, further comprising thresholding the first feature set and the second feature set and generating binary representations of the visible-light image data and the infrared image data.

7. The method of claim 1, wherein the desired similarity figure represents the greatest degree of similarity between the first feature set and the second feature set among the overlapping alignments.

8. The method of claim 7, further comprising comparing the desired similarity figure to a similarity threshold and setting the selected overlapping alignment to a default alignment if the desired similarity is less than the similarity threshold.

9. The method of claim 8, wherein the default alignment is a manual alignment.

10. The method of claim 1, further comprising employing a subset of at least one of the visible-light image data and the infrared image data in generating the plurality of overlapping alignments.

11. The method of claim 10, wherein the subset is determined from a physical configuration of the thermal imaging camera.

12. A thermal imaging camera, comprising:
- a visible-light camera module having a visible-light sensor for generating visible-light image data corresponding to a first view of a scene;
- an infrared camera module having an infrared sensor for generating infrared image data corresponding to a second view of the scene, the infrared sensor offset from the visible-light sensor such that the first view and the second view, and the corresponding visible-light image data and infrared image data, have a parallax error;
- a display for displaying at least a portion of the visible-light image data and/or at least a portion of the infrared image data; and
- a programmable processor coupled with the display and the infrared and visible-light camera modules, the processor programmed with instructions for registering the visible-light image data and the infrared image data, the registering comprising
  detecting a first feature set in the visible-light image data,
  detecting a second feature set in the infrared image data,
  generating a plurality of overlapping alignments of the infrared image data and the visible light image data,
  calculating a similarity figure for each overlapping alignment, the similarity figure being a function of the relative alignment of the first feature set and the second feature set,
  selecting one of the overlapping alignments having a desired similarity figure, and
  aligning the visible-light image data and the infrared image data according to the selected overlapping alignment.

13. The thermal imaging camera of claim 12, the registering further comprising employing a subset of at least one of the visible-light image data and the infrared image data in generating the plurality of overlapping alignments, wherein the subset is determined from a position of the first view relative to the second view.

14. The thermal imaging camera of claim 13, wherein the visible-light camera module and the infrared camera module are configured such that the first view is substantially horizontally aligned with the second view.

15. The thermal imaging camera of claim 12, the registering further comprising thresholding the first feature set and the second feature set and generating binary representations of the visible-light image data and the infrared image data.

16. The thermal imaging camera of claim 12, wherein the first and second feature sets comprise edges in the visible-light image data and the infrared image data, respectively.

17. A thermal imaging camera, comprising:
- a visible-light camera module for generating visible-light image data corresponding to a first view of a scene;
- an infrared camera module for generating infrared image data corresponding to a second view of the scene, the infrared camera module offset from the visible-light camera module such that the first view and the second view, and the corresponding visible-light image data and infrared image data, have a parallax error;
- a display for displaying at least a portion of the visible-light image data and/or at least a portion of the infrared image data;
- a manual adjustment mechanism for reducing the parallax error; and
- a programmable processor coupled with the display and the infrared and visible-light camera modules, the processor programmed with instructions for registering the visible-light image data and the infrared image data, the registering comprising
  detecting a first feature set in the visible-light image data,
  detecting a second feature set in the infrared image data,
  generating a plurality of overlapping alignments of the infrared image data and the visible light image data,
  calculating a similarity figure for each overlapping alignment, the similarity figure being a function of the relative alignment of the first feature set and the second feature set,
  selecting one of the plurality of overlapping alignments having a desired similarity figure, and
  aligning the visible-light image data and the infrared image data according to the selected overlapping alignment.

18. The thermal imaging camera of claim 17, wherein the registering further comprises employing a subset of at least one of the visible-light image data and the infrared image data in generating the plurality of overlapping alignments, the subset corresponding to a setting of the manual adjustment mechanism.

19. The thermal imaging camera of claim 18, wherein the manual adjustment mechanism comprises focusable optics for adjusting the first view of the scene or the second view of the scene.

20. The thermal imaging camera of claim 17, further comprising comparing the desired similarity figure to a similarity threshold and setting the selected overlapping alignment to a manual alignment determined by the manual adjustment mechanism if the desired similarity is less than the similarity threshold.

* * * * *